United States Patent
Fry et al.

(10) Patent No.: US 9,917,954 B2
(45) Date of Patent: Mar. 13, 2018

(54) METHODS AND APPARATUS TO DETERMINE A TELECOMMUNICATIONS ACCOUNT STATUS

(71) Applicants: Ranney Harrold Fry, Safety Harbor, FL (US); Madhusudhan Reddy Alla, Richardson, TX (US)

(72) Inventors: Ranney Harrold Fry, Safety Harbor, FL (US); Madhusudhan Reddy Alla, Richardson, TX (US)

(73) Assignee: The Nielsen Company (US), LLC, New York, NY (US)

( * ) Notice: Subject to any disclaimer, the term of this patent is extended or adjusted under 35 U.S.C. 154(b) by 147 days.

(21) Appl. No.: 14/134,815

(22) Filed: Dec. 19, 2013

(65) Prior Publication Data
US 2015/0181021 A1    Jun. 25, 2015

(51) Int. Cl.
| | | |
|---|---|---|
| *H04Q 7/10* | (2006.01) | |
| *H04M 17/00* | (2006.01) | |
| *G06Q 50/30* | (2012.01) | |
| *G06Q 10/06* | (2012.01) | |
| *H04M 15/00* | (2006.01) | |
| *H04M 17/02* | (2006.01) | |

(52) U.S. Cl.
CPC .......... *H04M 17/20* (2013.01); *G06Q 10/063* (2013.01); *G06Q 50/30* (2013.01); *H04M 15/705* (2013.01); *H04M 17/02* (2013.01); *H04M 17/10* (2013.01)

(58) Field of Classification Search
CPC .... G06Q 20/00; G06Q 20/102; G06Q 20/108; H04W 4/26; H04W 4/24
See application file for complete search history.

(56) References Cited

U.S. PATENT DOCUMENTS

| | | | |
|---|---|---|---|
| 5,206,901 A | 4/1993 | Harlow et al. | |
| 5,903,633 A | 5/1999 | Lorsch | |
| 6,333,976 B2 | 12/2001 | Lesley | |
| 6,424,706 B1 * | 7/2002 | Katz | ...... G06Q 20/28 379/112.01 |
| 6,751,295 B2 | 6/2004 | McCulley et al. | |
| 8,244,612 B2 | 8/2012 | Chakiris et al. | |
| 8,369,826 B2 | 2/2013 | Alla | |

(Continued)

OTHER PUBLICATIONS

Jon Evans, "TxtEagle Raises $8.5 Million to give 2.1 Billion a Voice", retrieved from the internet: http://techcrunch.com/2011/04/12/txteagle-raises-8-5-million/, Apr. 12, 2011, 6 pages.

*Primary Examiner* — Kathy Wang-Hurst
*Assistant Examiner* — Julio Perez
(74) *Attorney, Agent, or Firm* — Hanley, Flight & Zimmerman, LLC

(57) ABSTRACT

Example methods, apparatus, and articles of manufacture are disclosed to determine a telecommunications account status. An example method includes initiating a credit transfer request via the device identifier, determining, via a processor, whether an account associated with the device identifier comprises a prepaid type in response to receiving an indication of credit transfer success, and determining whether the account associated with the device identifier comprises a non-prepaid account type in response to receiving an indication of credit transfer failure.

18 Claims, 4 Drawing Sheets

(56) References Cited

U.S. PATENT DOCUMENTS

| | | | |
|---|---|---|---|
| 8,510,223 B2* | 8/2013 | Blair | G06Q 20/32 |
| | | | 705/44 |
| 8,594,286 B2* | 11/2013 | New | G06Q 20/12 |
| | | | 379/110.01 |
| 2004/0133507 A1 | 7/2004 | Barbour | |
| 2008/0033877 A1* | 2/2008 | Blair et al. | 705/44 |
| 2008/0228557 A1 | 9/2008 | Sepehri-Nik et al. | |
| 2010/0130136 A1 | 5/2010 | Sepehri-Nik et al. | |
| 2010/0167689 A1 | 7/2010 | Sepehri-Nik et al. | |
| 2011/0055077 A1* | 3/2011 | French et al. | 705/39 |
| 2011/0270747 A1* | 11/2011 | Xu | 705/40 |
| 2012/0095905 A1* | 4/2012 | Hodges | 705/39 |
| 2012/0239563 A1* | 9/2012 | Csoka | 705/40 |
| 2014/0279388 A1* | 9/2014 | Kinyua | G06Q 40/025 |
| | | | 705/38 |

\* cited by examiner

METHODS AND APPARATUS TO DETERMINE A TELECOMMUNICATIONS ACCOUNT STATUS

FIELD OF THE DISCLOSURE

This disclosure relates generally to wireless market research, and, more particularly, to methods and apparatus to determine a telecommunications account status.

BACKGROUND

Wireless telephone services may be provided to consumers through contractual agreements in which a subscriber (e.g., a paying consumer or business that is associated with an account of a service provider) is obligated to pay a set amount of money per month, and receives one or more wireless features and/or services in return. Wireless features may include a number of minutes per time period (e.g., a number of talk-time minutes per month), a number of text messages (e.g., short-message-service (SMS) text messages) per time period, and/or an amount of data usage per time period (e.g., a number of megabytes (MB) of data for electronic mail, Internet access, etc.). Some subscribers prefer to avoid contractual agreements when obtaining one or more wireless services and/or features. Such subscribers may, instead, obtain wireless services by way of subscribing to prepaid wireless plans that may not require credit checks, social security numbers, and/or extended contractual terms that may include contract termination fees and/or other penalties.

Prepaid wireless subscribers typically own and/or purchase a wireless telephone and separately purchase a quantity of minutes to be used with the wireless telephone. If a purchased quantity of minutes (and/or any other wireless service-type such as text messaging, data services, etc.) is fully used or expires from lack of use, the subscriber may purchase additional wireless services from a kiosk and/or retailer (e.g., a convenience store). When a contractual wireless subscriber does not use their phone for a period of time during the contract, such subscribers continue to pay an agreed contract price for each delineated time period (e.g., a flat fee per month during the contract duration). On the other hand, when a prepaid wireless subscriber does not use their phone for a period of time (e.g., 60 days, 90 days, etc.), the purchased quantity of minutes may expire from lack of use, but the subscriber's authorization to use the wireless telephone number associated with the wireless telephone remains available when additional minutes are purchased. In some instances, one or more other time periods of inactivity with a prepaid wireless phone may result in relinquishment of the subscriber's wireless telephone number.

DETAILED DESCRIPTION

Because a wireless network may include subscribers associated with both long-term contractual wireless subscribers and prepaid wireless subscribers, calculating and/or measuring an active subscriber base may include measuring contractual wireless subscribers, prepaid wireless subscribers having active credit (e.g., active minutes that have not expired due to lack of use), and/or prepaid wireless subscribers having expired credit.

Example methods, apparatus, and/or articles of manufacture disclosed herein involve determining a status of a device identifier and/or an account associated with a device identifier. Examples disclosed herein utilize a crediting system of a service provider that facilitates credit transfers to accounts associated with subscribers of the service provider. Requests to transfer credit (e.g., via credit transfers) may include a device identifier (e.g., a telephone number, an email address, etc.) and an amount of credit that is to be applied to an account associated with the device identifier. The example crediting system accepts or denies the credit transfer request based on a number of factors (e.g., whether the device identifier is associated with a prepaid account, whether the device identifier is associated with the service provider, whether the amount of credit transferred satisfies a threshold, etc.). Based on acceptance or denial of the credit transfer request and any messages accompanying the acceptance or denial of the credit transfer request, examples disclosed herein determine a status of the device identifier indicated in the credit transfer request.

An example method to determine a status of a device identifier initiates a credit transfer request via a device identifier and determines whether an account associated with the device identifier comprises a prepaid type in response to receiving an indication of credit transfer success. Some example methods further involve determining an account associated with a device identifier is a non-prepaid account type (e.g., other than a prepaid account) in response to receiving an indication of credit transfer failure. The example non-prepaid account type may be one or more of a contractual account type (e.g., postpaid), an inactive account type (e.g., the device identifier is not in use, the device identifier is associated with an inactive account, etc.), an unassigned account type (e.g., the device identifier is not assigned to an account), etc.

Figure 1:
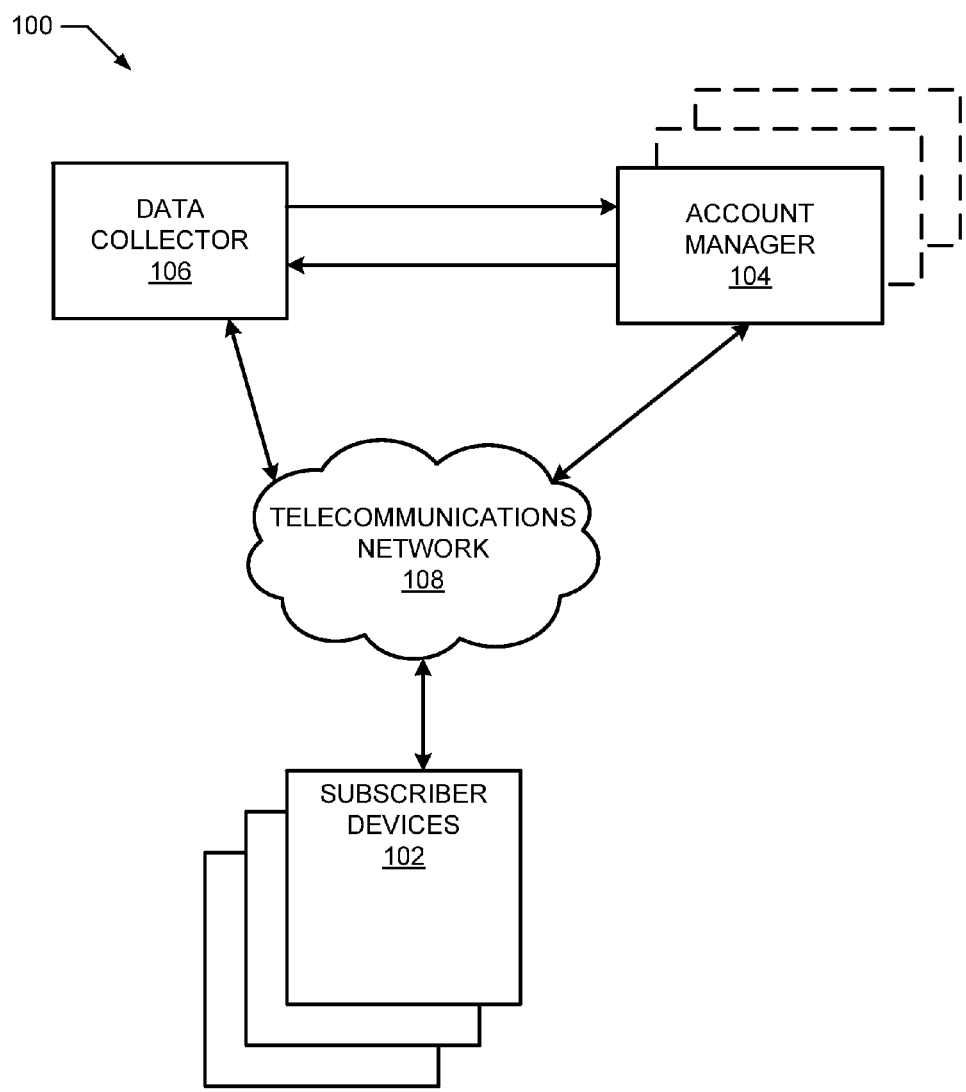
FIG. 1 illustrates an example environment of use for an example data collector constructed in accordance with the teachings of this disclosure.

FIG. 1 is a block diagram of an example environment of use 100 in which a data collector 106 constructed in accordance with the teachings of this disclosure detects and/or measures the status of one or more subscriber(s) and/or device identifier(s). The example environment 100 of FIG. 1 includes subscriber devices 102, an account manager 104 (e.g., a crediting system) operated by a particular service provider (e.g., a mobile carrier such as Verizon Wireless, AT&T, T-Mobile, etc.) and/or other crediting system (e.g., a third party crediting system), and a telecommunications network 108. The example telecommunications network 108 may be the plain old telephone system (POTS), a public or private telephone network, the Internet and/or any other network.

In the illustrated example of FIG. 1, the subscriber devices 102 are mobile devices (e.g., cellular telephones, smartphones, tablet computers, iPads, etc.) that allow communication with other mobile devices and/or landline devices (e.g., landline telephones, desktop computers, etc.) via the telecommunications network 108. In some examples, the subscriber devices are landline devices (e.g., landline telephones, desktop computers, servers, etc.). The example subscriber devices 102 are associated with one or more device identifier(s). Example device identifiers include a telephone number, a device hardware serial number (e.g., a mobile equipment identification (MEID), an international mobile station equipment identity (IMEI), an integrated circuit card ID (ICCID)), an internet protocol (IP) address, a Universal Resource Locator (URL), an electronic mail (email) address, and/or any other type of identifier. The example subscriber devices 102 may be associated with an account managed by the account manager 104.

The example account manager 104 of FIG. 1 is controlled and/or operated by an example service provider (e.g., a mobile carrier, such as Verizon Wireless, AT&T, T-Mobile, and/or any other telecommunications service provider). In the illustrated example of FIG. 1, the account manager 104 (e.g., a system including a crediting system and/or a billing system) manages accounts of subscriber devices (e.g., one or more of the subscriber devices 102 subscribed to the example service provider). For example, if a subscriber device 102 is associated with a prepaid account of the service provider, the example account manager 104 manages credit for the corresponding account of the subscriber device 102. For example, the account manager 104 may include a crediting system to manage minutes (e.g., from a prepaid calling card), currency, etc. for subscribers of the service provider using a device identifier of the subscriber device 102 and/or an account associated with the device identifier. The example account manager 104 of FIG. 1 adds and/or otherwise attempts to add credit in response to requests to transfer credit received from the subscriber, credit received from the example service provider, and/or credit received from a third party (e.g., a measurement entity associated with the data collector 106, a promotional entity that rewards subscribers for participating in a survey, etc.). In some examples, the account manager 104 facilitates the addition of funds (e.g., via credit transfer requests) from a third party via a "top-up" application programming interface (API) (e.g., Ezetop™) that enables consumers, entities, and/or subscribers to add credit to a subscriber account. In some examples, the account manager 104 facilitates the addition of funds via a web interface and/or web page of the service provider.

The example account manager 104 of FIG. 1 may decrease credit for a prepaid account when a subscriber (or other user) uses talk-time minutes (e.g., by participating in a telephone session), when a subscriber uses data (e.g., by surfing the Internet, sending/receiving email, etc.), when a subscriber sends one or more text(s) (e.g., by sending/receiving a text or SMS message), etc. via the example subscriber device 102. In some examples, the account manager 104 manages accounts associated with subscriber devices (e.g., one or more of the subscriber devices 102) under a contractual agreement. Accordingly, the account manager 104 may maintain that the status of the account is at least one of active (e.g., payments are up to date), delinquent (e.g., payments are behind), inactive (e.g., the account has been cancelled), etc.

In some examples, the account manager 104 of FIG. 1 includes a messaging service that provides an account status (e.g., via status messages) based on requests to transfer credit from a subscriber, from a third party (e.g., a measurement entity, a promotional entity, etc.), etc. In some examples, the mobile account manager 104 sends an acknowledgement message to an entity (e.g., a subscriber, a third party, etc.) that requests to transfer credit to an account that indicates that the account has been successfully credited with the requested amount of credit. In some examples, the account manager 104 sends one or more error messages when an account management error occurs (e.g., due to attempting to transfer credit to a contractual account, attempting to access an inactive or non-existing account, attempting to transfer less than a minimum threshold amount of credit, an authorization failure, etc.). In the example of FIG. 1, one or more account manager(s) 104 (designated by dotted lines in FIG. 1) managed by one or more additional service provider(s) and/or a same example service provider are present. In some examples, the account manager 104 manages accounts for one or more service providers (e.g., one or more of Verizon Wireless, AT&T, T-Mobile, etc.).

The example data collector 106 of FIG. 1 collects data corresponding to the subscriber devices 102 via the account manager 104. In some such examples, the data collector 106 determines and/or measures statuses of the subscriber devices 102 (e.g., calculates statistics of the determined account statuses) via the account manager 104. The example data collector 106 of FIG. 1 may be a device managed by a third party entity (e.g., a measurement entity such as The Nielsen Company (US), LLC). The example data collector 106 of FIG. 1 communicates with the account manager 104 directly or via the telecommunications network 108. In some examples, the data collector 106 communicates with and/or accesses the account manager 104 via a dedicated connection over the Internet. In some examples, the data collector 106 accesses the account manager 104 via a "top-up" application programming interface (API). In some examples, the data collector 106 accesses the account manager 104 via a web-page and/or web-interface.

In the example of FIG. 1, the data collector 106 collects status data by requesting to transfer credit (e.g., a number of minutes, an amount of currency, etc.) to an account corresponding to a device identifier (e.g., a telephone number, an IP address, a serial number, IMEI, etc.) associated with one or more of the subscriber device(s) 102. Based on a response received from the account manager 104, the data collector 106 of FIG. 1 classifies the account and stores a record indicating the status. The example status may indicate that a particular mobile device 102 (a) corresponds to a prepaid/contractual agreement, (b) is active/inactive, (c) is assigned/unassigned, etc.

Figure 2:
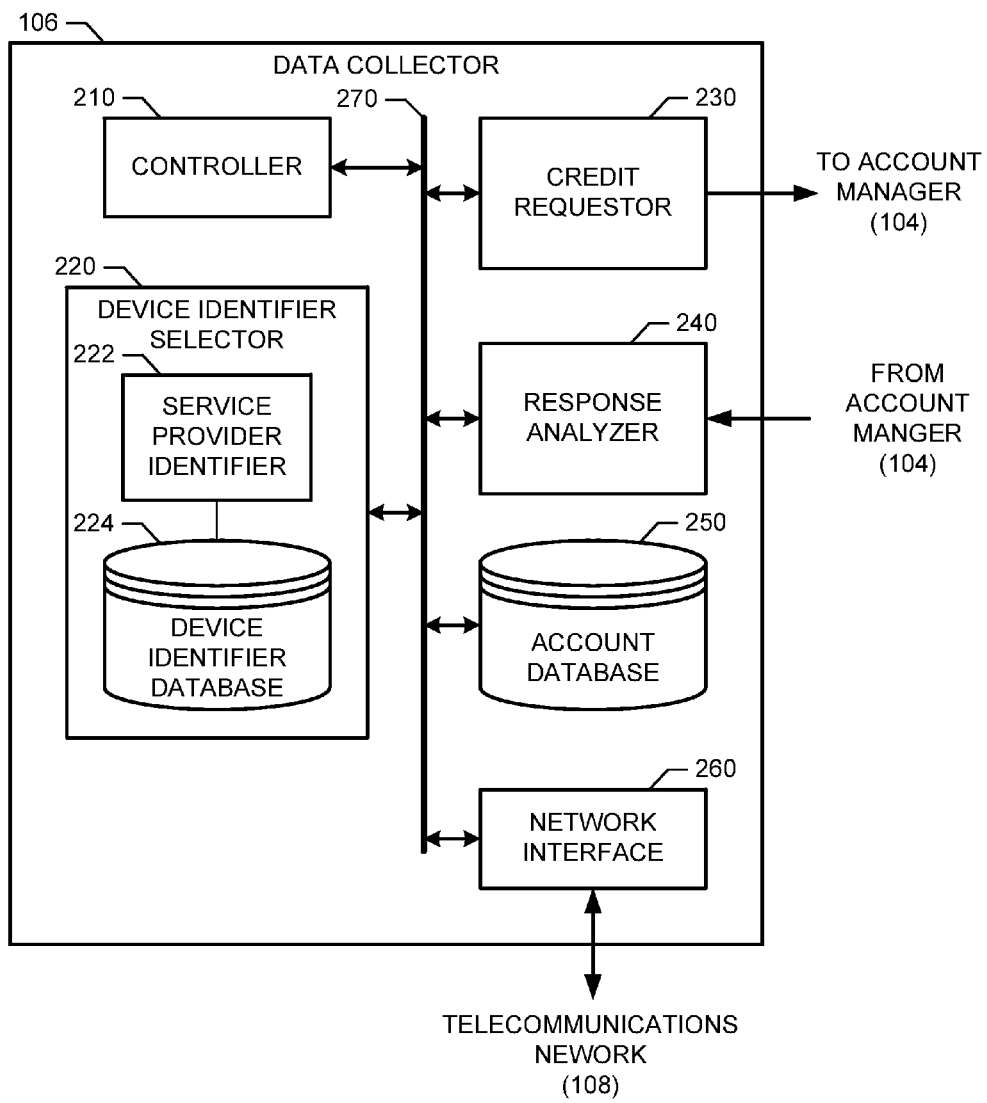
FIG. 2 is a block diagram of an example implementation of the example data collector of FIG. 1.

FIG. 2 is a block diagram of an example implementation of the example data collector 106 of FIG. 1. The example data collector 106 of FIG. 2 includes an example controller 210, an example device identifier selector 220, an example account database 250, and an example network interface 260. In the example of FIG. 1, the example device identifier selector 220 includes an example service provider identifier 222 and an example device identifier database 224. In the illustrated example of FIG. 2, a communication bus 270 facilitates communication between the controller 210, the device identifier selector 220, the credit requestor 230, the response analyzer 240, the account database 250, and/or the network interface 260. The example controller 210 controls the data collector 106 to collect data (e.g., in response to a user request, periodically, aperiodically, etc.) to detect and/or measure statuses of one or more of the subscriber device(s) 102.

The example device identifier selector 220 of FIG. 2 selects a mobile device identifier (e.g., a telephone number, an IP address, an IMEI number, an email address, etc.) to determine a status of a subscriber device (if one exists) associated with the selected device identifier. In response to instructions from the controller 210, the device identifier 220 selects a device identifier from the device identifier database 224. The example device identifier database 224 may include device identifiers identified by a measurement entity (e.g., The Nielsen Company (US), LLC) and/or received from one or more service providers upon activation of one or more accounts associated with the respective device identifiers, etc. In some examples, the device identifier selector 220 randomly selects a device identifier. In some examples, the service provider identifier 222 identifies a service provider associated with the selected device identifier.

In some examples, the device identifier database 224 stores device identifiers corresponding only to a service provider associated with the account manager 104. In other examples, the service provider identifier 222 identifies a service provider associated with the selected identifier by polling the device identifier 224 and/or using any other suitable technique (e.g., the device identifier database 224 may store records indicating a service provider is associated with a particular device identifier). The example device identifier selector 220 may provide information indicating the identified service provider to the credit requestor 230, which uses the information (e.g., a web-site, an IP address, a URL, an API, etc.) to access a service provider account manager (e.g., the account manager 104) to request a credit transfer. Any number of service providers and/or device identifiers may be in the device identifier database 224.

The example device identifier selector 220 of FIG. 2 provides the selected device identifier and/or service provider information to the credit requestor 230. The credit requestor 230 of the illustrated example requests to transfer credit, via the mobile account manager 104, to an account (if one exists) associated with the selected device identifier. In some examples, the credit requestor 230 additionally or alternatively requests one or more other account managers operated by one or more other service providers to credit an account corresponding to the selected device identifier. In some examples, the credit requestor 230 determines a threshold amount of credit (e.g., from the device identifier database 224) that is to be requested based on the service provider identified by the service provider identifier 222. For example, some service providers and/or account managers (e.g., the account manager 104) may only accept credit transfers over a threshold amount (e.g., $10, 30 minutes, etc.). In such an example, if a credit transfer for less than the threshold amount is requested, the credit transfer may be denied.

In the illustrated example of FIG. 2, the example credit requestor 230 requests (via a data message, via completing a credit transfer form of a web-page, etc.) the account manager 104 of FIG. 1 to transfer credit to a prepaid account associated with the device identifier selected by the device identifier selector 220. The example account manager 104 may add the requested credit (e.g., one minute, one cent, ten dollars, etc.) to the account if the device identifier is associated with a prepaid account. In some examples, if the account manager 104 successfully completes the requested credit transfer, the account manager 104 sends an acknowledgement back to the data collector 106 indicating that the requested credit has been added to the account. In such examples, the response analyzer 240 determines that the device identifier is associated with an active and/or a prepaid mobile account. In some such examples, the response analyzer 240 notifies the credit requestor 230 of an acceptance of credit. In some such examples, the credit requestor 230 requests cancellation and/or voiding the corresponding requested credit transfer to recuperate the credit transfer funds. For example, the credit requestor 230 sends a "stop credit transfer" message or "revoke credit transfer" message to the account manager 104 to cancel the credit transfer. In such examples, the data collector 106 (and/or party operating the data collector 106) recuperates any accepted credit transfers.

The example response analyzer 240 of FIG. 2 analyzes responses (e.g., acknowledgement message(s), credit acceptance message(s), error message(s), etc.) from the account manager 104 to determine a status (e.g., prepaid, non-prepaid, etc.) of the selected device identifier. In the illustrated example, the example response analyzer 240 analyzes a response (or lack of a response) to determine the status of a particular device identifier. In some examples, the account manager 104 sends a reply message back to the data collector 106 in response to a request to transfer credit to an account associated with the selected device identifier. In some examples, when the account manager 104 encounters an error when attempting to credit an account (e.g., due to the device identifier not being associated with a prepaid account, due to the device identifier not being associated with an active prepaid account, due to a device identifier not being recognized, due to an insufficient amount of funds transferred etc.), the account manager 104 sends an error message back to the response analyzer 240.

In some examples, the account manager 104 sends an error message in response to a request to transfer credit. The example error message may include text and/or an error code indicating a status of the device identifier (e.g., not prepaid, inactive, not recognized, unassigned, etc.). In some examples, the response analyzer 240 parses the error message to identify one or more particular key words that indicate a status of the device identifier. For example, a response message may indicate "device identifier inactive," "no corresponding prepaid account recognized," "device identifier not recognized," etc. The example response analyzer 240 may then determine a status of the selected device identifier based on the key word(s) identified in the parsed response.

In some examples, the account manager 104 sends a response message that does not include sufficient information, words, and/or codes to provide a status (e.g., not prepaid account, inactive, not associated with service provider, etc.). For example, such response messages may state "invalid transaction," "invalid device identifier," etc. In such examples, in which a status of a device identifier is not specified, the response analyzer 240 of the illustrated example determines a corresponding status based on default settings. For example, the response analyzer 240 may determine that "invalid transaction", based on identification of the keywords "invalid" and/or "transaction," indicates at least one of (1) the selected device identifier is not associated with a prepaid account, (2) the selected device identifier is not associated with a service provider operating the account manager 104, (3) an insufficient amount of credit was requested to be transferred, etc.

In some examples, when the account manager 104 sends a response that an insufficient amount of funds was requested (e.g., because a corresponding requested credit transfer indicated an amount that was below a threshold amount for the service provider associated with the account manager), the response analyzer 240 instructs the credit requestor 230 to submit a second (or a third, fourth, etc.) credit transfer indicating an amount greater than the previous insufficient credit transfer request. In some examples, the response analyzer determines the status of an account associated with a device identifier when it is determined that an insufficient amount of credit was requested (e.g., it is presumed that the device identifier is associated with an active/prepaid account, because a different error message (e.g., "device identifier not recognized," "device identifier not associated with prepaid account," etc.) was not received. Accordingly, in some examples, the response analyzer 240 is configured to determine the status of a device identifier based on settings for particular response types (e.g., "invalid transaction," "insufficient credit requested," "unrecognized account," etc.).

In some examples, the response analyzer 240 determines that a response was not received by the data collector 106 for a corresponding request to transfer credit. In such examples, the response analyzer 240 determines that a response was not received based on a timeout. For example the response analyzer 240 of the illustrated example monitors requests sent from the credit requestor 230 and if a response is not received within a threshold period of time (e.g., 1 second, 1 minute, 10 minutes, etc.), the response analyzer 240 determines that no response was received. In some such examples, based on settings of the data collector 106 (e.g., set by a user, default settings, etc.), the response analyzer 240 determines that the selected device identifier is associated with an active and/or a prepaid account when no response is received from the account manager 104 (e.g., it is presumed that the credit was accepted and applied). In some examples, when no response is received from the mobile account manager 104, the response analyzer determines that the device identifier is not associated with the particular service provider. In such examples, the response analyzer 240 instructs the credit requestor 230 to initiate a request to transfer credit to another account manager that is operated by a second service provider different from the service provider that was first contacted (e.g., different from the service provider which operates the account manager 104). In some examples, the account manager may reply with an error message (e.g., unrecognized account error) indicating that the account is not associated with the service provider.

In some examples, the device identifier indicated in a request is not associated with a prepaid account. In such examples, the account manager 104 may reply with an error message (e.g., account type error) indicating that such an account is not a prepaid account. Accordingly, the response analyzer 240 stores the status (e.g., "not prepaid," "contractual," "postpaid," etc.) of the account associated with the device identifier in the account database 250.

In some examples, the device identifier may be associated with a prepaid account, but is inactive. In such examples, the account manager 104 may reply with an error message (e.g. "inactive account") indicating that such an account is inactive and the response analyzer 240 stores a corresponding status (e.g., "inactive prepaid") in the example account database 250. In some examples, the device identifier is not associated with the service provider. In such examples, the account manager 104 may reply with an error message indicating that such an account does not exist with the service provider. In some such examples, the response analyzer 240 stores a corresponding status (e.g., "not associated with service provider") in the account database 250.

The example network interface 260 of FIG. 2 facilitates communication with the telecommunications network 108 of FIG. 1. In some examples, the credit requestor 230 sends, via the network interface 260, requests to transfer credit. In some examples, the response analyzer 240 receives response messages (e.g., acknowledgments, error messages, etc.) via the network interface 270.

While an example manner of implementing the data collector 106 of FIG. 1 is illustrated in FIG. 2, one or more of the elements, processes and/or devices illustrated in FIG. 2 may be combined, divided, re-arranged, omitted, eliminated and/or implemented in any other way. Further, the example controller 210, the example device identifier selector 220, including the example service provider identifier 222 and the device identifier database 224, the example credit requestor 230, the example response analyzer 240, the example account database 250, the example network interface 260 and/or, more generally, the example data collector 106 of FIG. 2 may be implemented by hardware, software, firmware and/or any combination of hardware, software and/or firmware. Thus, for example, any of the example controller 210, the example device identifier selector 220, including the example service provider identifier 222 and the device identifier database 224, the example credit requestor 230, the example response analyzer 240, the example account database 250, the example network interface 260 and/or, more generally, the example data collector 106 could be implemented by one or more analog or digital circuit(s), logic circuits, programmable processor(s), application specific integrated circuit(s) (ASIC(s)), programmable logic device(s) (PLD(s)) and/or field programmable logic device(s) (FPLD(s)). When reading any of the apparatus or system claims of this patent to cover a purely software and/or firmware implementation, at least one of the example controller 210, the example device identifier selector 220, including the example service provider identifier 222 and the device identifier database 224, the example credit requestor 230, the example response analyzer 240, the example account database 250, and/or the example network interface 260 is/are hereby expressly defined to include a tangible computer readable storage device or storage disk such as a memory, a digital versatile disk (DVD), a compact disk (CD), a Blu-ray disk, etc. storing the software and/or firmware. Further still, the example data collector 106 of FIG. 1 may include one or more elements, processes and/or devices in addition to, or instead of, those illustrated in FIG. 2, and/or may include more than one of any or all of the illustrated elements, processes and devices.

Figure 3:
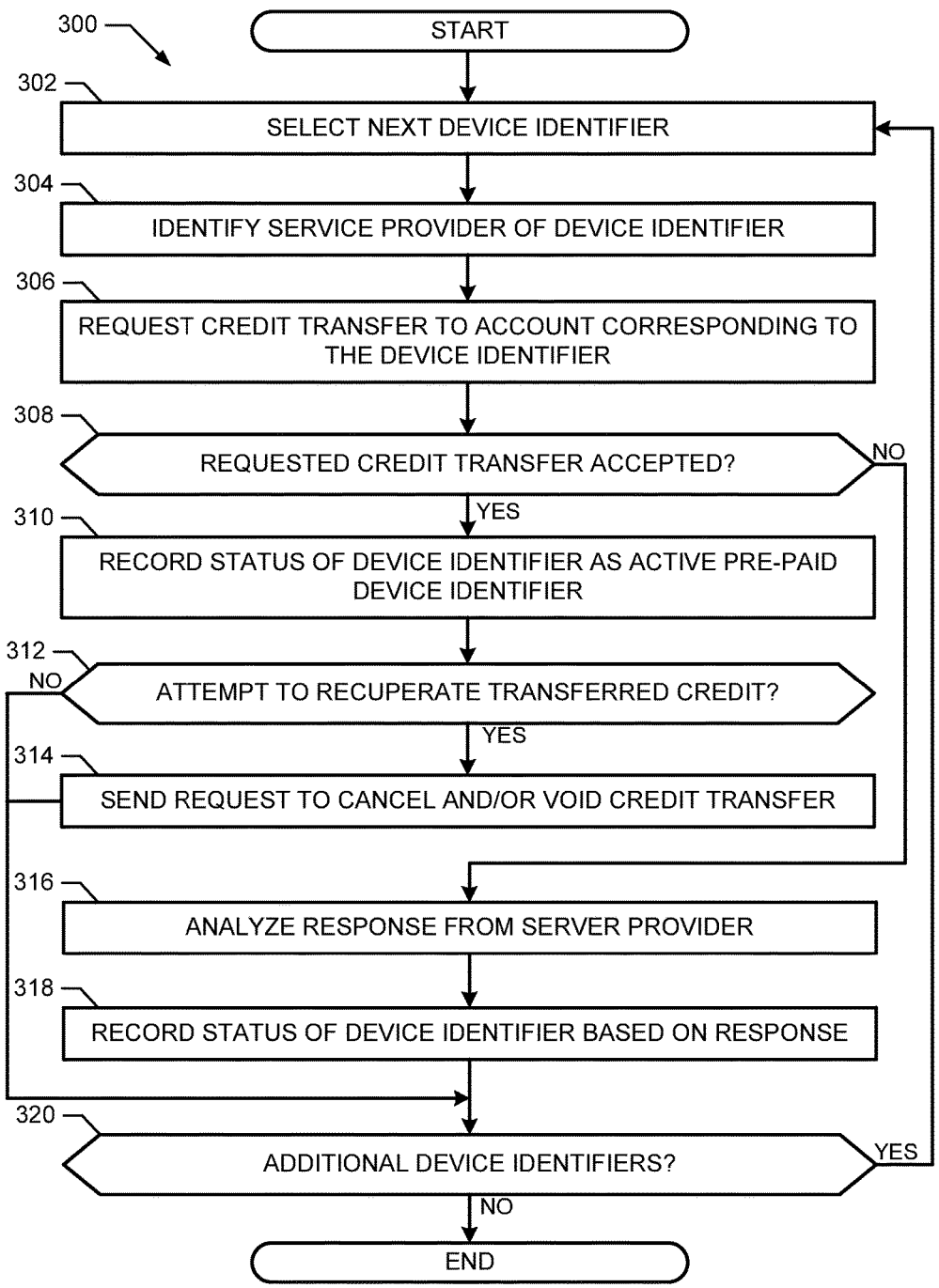
FIG. 3 is a flowchart representative of machine readable instructions that may be executed to implement the example data collector of FIGS. 1 and/or 2.

A flowchart representative of example machine readable instructions for implementing the data collector 106 of FIGS. 1 and/or 2 is shown in FIG. 3. In this example, the machine readable instructions comprise a program for execution by a processor such as the processor 412 shown in the example processor platform 400 discussed below in connection with FIG. 6. The program may be embodied in software stored on a tangible computer readable storage medium such as a CD-ROM, a floppy disk, a hard drive, a digital versatile disk (DVD), a Blu-ray disk, or a memory associated with the processor 412, but the entire program and/or parts thereof could alternatively be executed by a device other than the processor 412 and/or embodied in firmware or dedicated hardware. Further, although the example program is described with reference to the flowchart illustrated in FIG. 3, many other methods of implementing the example data collector 106 may alternatively be used. For example, the order of execution of the blocks may be changed, and/or some of the blocks described may be changed, eliminated, or combined.

The program 300 of FIG. 3 begins with an initiation of the data collector 106 (e.g., via a user request, via an expiration of a certain time period, via a scheduled time trigger, etc.) to collect status information for device identifiers (e.g., telephone numbers, IP addresses, URLs, email addresses, IMEIs, etc.). At block 302, the example device identifier selector 220 selects (e.g., in response to instructions from the controller 210) a device identifier from the device identifier database 224. At block 304, the example service provider identifier 222 identifies the service provider of the device identifier. In some examples, at block 304, the service provider identifier 222 identifies the service provider based on information in the device identifier database 224 (e.g., by polling the device identifier database 224). In some examples, the service provider identifier 222 cross-references the selected device identifier to a service provider identified in another database associated with the data collector 106 or an operating entity associated with the data collector 106. In some examples, the device identifier database 224 is a database dedicated for device identifiers for one or more service provider(s).

The example credit requestor 230, at block 306 of FIG. 3, requests the account manager 104 (FIG. 1) to transfer credit (e.g., money, minutes, data, etc.) to an account corresponding to the selected device identifier. In some examples, the credit requestor 230 requests multiple account managers in addition (or alternative to) the account manager 104. At block 308, the example response analyzer 240 determines whether the requested credit was accepted by the account manager 104. In some examples, the response analyzer 240 determines that the credit was accepted based on a response message indicating that the credit was accepted by and/or applied to an account corresponding to the selected device identifier. In some examples, at block 308, the response analyzer 240 determines that the credit was accepted based on a lack of a response from the account manager 104. If the response analyzer 240 determines, at block 308, that the credit was accepted, the response analyzer 240 records a status of the device identifier in the account database 250 as associated with an active prepaid account (block 310). After recording the status for the selected device identifier at block 310, control advances to block 312.

At block 312, the controller 210 determines whether to attempt to recuperate the transferred credit requested in block 306. In some examples, the controller 210 determines that a credit transfer should be cancelled based on a credit amount of the requested credit transfer. For example, if the credit amount of the credit transfer was above a threshold amount (e.g., five cents, 1 minute, etc.), the controller determines that cancellation of the credit transfer is to be requested. If the controller 210 determines that the credit transfer should be cancelled, at block 314, the credit requestor 230 sends a request to the account manager 104 to cancel and/or void the credit transfer. If the controller 210 determines that the credit transfer is not to be cancelled, control advances to block 320.

Returning to block 308, if the response analyzer 240, determines that the requested credit was not accepted (e.g., based on receiving an error message from the account manager 104), the response analyzer 240 analyzes a response from the account manager 104 (block 316). At block 316, the response analyzer 240 parses a response message (e.g., an error message) from the account manager 104. In some examples, at block 316, the response analyzer determines a status of the identifier based on an error code received in a response message. In some examples, the response analyzer 240, at block 316, determines that no response was received from the account manager 104 (e.g., based on a threshold amount of time passing after requesting a credit transfer). At block 318, the example response analyzer 250 records the status of the device identifier based on the received response in the account database 260. An example response may indicate that the device identifier is not recognized, is invalid, is not associated with an account that can be credited, etc. Accordingly, at block 318, the response analyzer 240 interprets the response to record a corresponding status of the device identifier.

At block 320 of FIG. 3, the controller 210 determines whether the data collector 106 is to continue analyzing additional device identifiers to determine the respective status of any additional device identifiers. If the data collector 106 is to continue determining the status of additional device identifiers (e.g., due to unclassified device identifiers remaining in the device identifier database 224), control returns to block 310. If, at block 320, the data collector 106 is not to continue determining the status of additional device identifiers, the program 300 ends.

As mentioned above, the example processes of FIG. 3 may be implemented using coded instructions (e.g., computer and/or machine readable instructions) stored on a tangible computer readable storage medium such as a hard disk drive, a flash memory, a read-only memory (ROM), a compact disk (CD), a digital versatile disk (DVD), a cache, a random-access memory (RAM) and/or any other storage device or storage disk in which information is stored for any duration (e.g., for extended time periods, permanently, for brief instances, for temporarily buffering, and/or for caching of the information). As used herein, the term tangible computer readable storage medium is expressly defined to include any type of computer readable storage device and/or storage disk and to exclude propagating signals and to exclude transmission media. As used herein, "tangible computer readable storage medium" and "tangible machine readable storage medium" are used interchangeably. Additionally or alternatively, the example processes of FIG. 3 may be implemented using coded instructions (e.g., computer and/or machine readable instructions) stored on a non-transitory computer and/or machine readable medium such as a hard disk drive, a flash memory, a read-only memory, a compact disk, a digital versatile disk, a cache, a random-access memory and/or any other storage device or storage disk in which information is stored for any duration (e.g., for extended time periods, permanently, for brief instances, for temporarily buffering, and/or for caching of the information). As used herein, the term non-transitory computer readable medium is expressly defined to include any type of computer readable storage device and/or storage disk and to exclude propagating signals and to exclude transmission media. As used herein, when the phrase "at least" is used as the transition term in a preamble of a claim, it is open-ended in the same manner as the term "comprising" is open ended.

Figure 4:
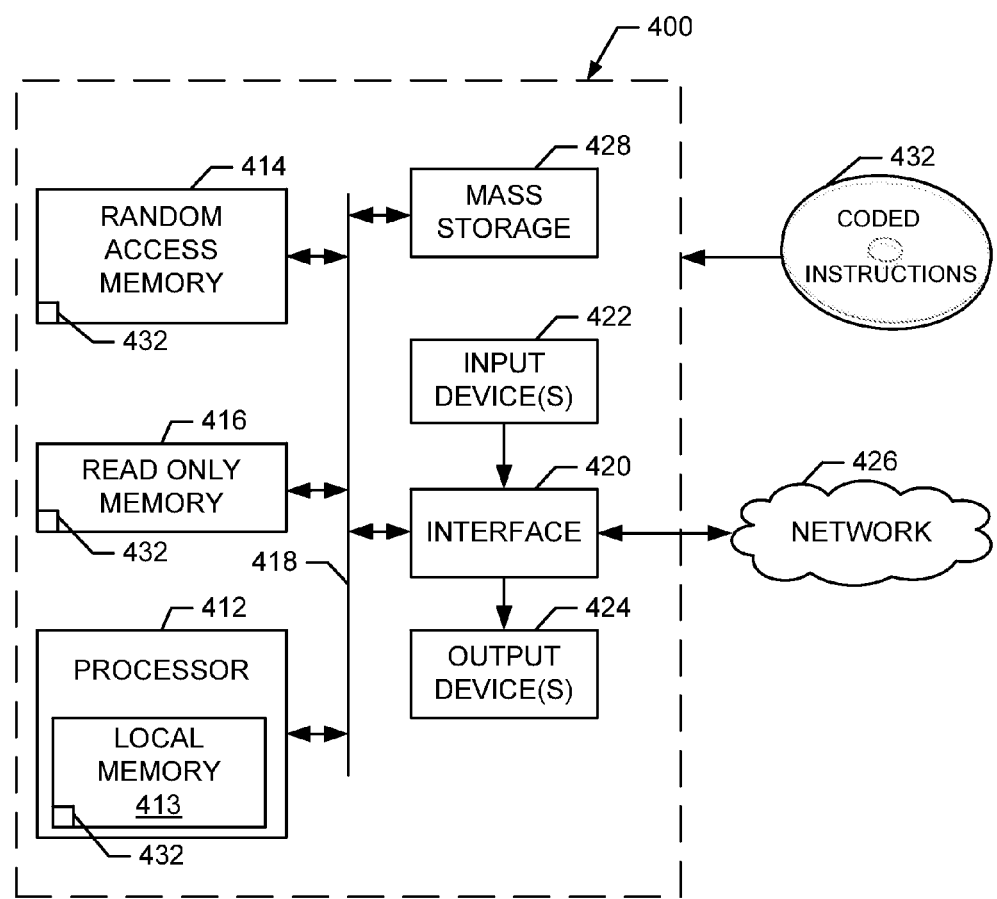
FIG. 4 is a block diagram of an example processing platform capable of executing the machine readable instructions of FIG. 3 to implement the example data collector of FIGS. 1 and/or 2.

FIG. 4 is a block diagram of an example processor platform 400 capable of executing the instructions of FIG. 3 to implement the data collector 106 of FIG. 2. The processor platform 400 can be, for example, a server, a personal computer, a mobile device (e.g., a cell phone, a smart phone, a tablet such as an iPad™), a personal digital assistant (PDA), an Internet appliance, or any other type of computing device.

The processor platform 400 of the illustrated example includes a processor 412. The processor 412 of the illustrated example is hardware. For example, the processor 412 can be implemented by one or more integrated circuits, logic circuits, microprocessors or controllers from any desired family or manufacturer.

The processor 412 of the illustrated example includes a local memory 413 (e.g., a cache). The processor 412 of the illustrated example is in communication with a main memory including a volatile memory 414 and a non-volatile memory 416 via a bus 418. The volatile memory 414 may be implemented by Synchronous Dynamic Random Access Memory (SDRAM), Dynamic Random Access Memory (DRAM), RAMBUS Dynamic Random Access Memory (RDRAM) and/or any other type of random access memory device. The non-volatile memory 416 may be implemented by flash memory and/or any other desired type of memory device. Access to the main memory 414, 416 is controlled by a memory controller.

The processor platform 400 of the illustrated example also includes an interface circuit 420. The interface circuit 420 may be implemented by any type of interface standard, such as an Ethernet interface, a universal serial bus (USB), and/or a PCI express interface.

In the illustrated example, one or more input devices 422 are connected to the interface circuit 420. The input device(s) 422 permit(s) a user to enter data and commands into the processor 412. The input device(s) can be implemented by, for example, an audio sensor, a microphone, a camera (still or video), a keyboard, a button, a mouse, a touchscreen, a track-pad, a trackball, isopoint and/or a voice recognition system.

One or more output devices 424 are also connected to the interface circuit 420 of the illustrated example. The output devices 424 can be implemented, for example, by display devices (e.g., a light emitting diode (LED), an organic light emitting diode (OLED), a liquid crystal display, a cathode ray tube display (CRT), a touchscreen, a tactile output device, a light emitting diode (LED), a printer and/or speakers). The interface circuit 420 of the illustrated example, thus, typically includes a graphics driver card, a graphics driver chip or a graphics driver processor.

The interface circuit 420 of the illustrated example also includes a communication device such as a transmitter, a receiver, a transceiver, a modem and/or network interface card to facilitate exchange of data with external machines (e.g., computing devices of any kind) via a network 426 (e.g., an Ethernet connection, a digital subscriber line (DSL), a telephone line, coaxial cable, a cellular telephone system, etc.).

The processor platform 400 of the illustrated example also includes one or more mass storage devices 428 for storing software and/or data. Examples of such mass storage devices 428 include floppy disk drives, hard drive disks, compact disk drives, Blu-ray disk drives, RAID systems, and digital versatile disk (DVD) drives.

The coded instructions 432 of FIG. 3 may be stored in the mass storage device 428, in the volatile memory 414, in the non-volatile memory 416, and/or on a removable tangible computer readable storage medium such as a CD or DVD.

From the foregoing, it will be appreciated that the above disclosed methods, apparatus and articles of manufacture determine a status of a mobile device and/or device identifier. In examples disclosed herein, a third party (e.g., a measurement entity) can determine whether a device identifier is active/inactive, associated with a prepaid or contractual account, and/or associated with a particular service provider using a crediting system of the service provider.

Although certain example methods, apparatus and articles of manufacture have been disclosed herein, the scope of coverage of this patent is not limited thereto. On the contrary, this patent covers all methods, apparatus and articles of manufacture fairly falling within the scope of the claims of this patent.

What is claimed is:

1. A method to determine a status of an account associated with a device, the method comprising:
   initiating, by executing an instruction with a processor, a credit transfer to the account associated with the device, the credit transfer identifying a device identifier of the device and the account associated with the device identifier;
   in response to receiving an indication that the credit transfer was successful:
      determining, by executing an instruction with the processor, the account associated with the device identifier is a prepaid account type, and requesting, via the processor, revocation of credit transferred to the account via the credit transfer; and
   in response to receiving an indication that the credit transfer was unsuccessful, determining based on an error included in the indication that the credit transfer was unsuccessful, by executing an instruction with the processor, the account associated with the device identifier is a contractual account, an inactive account, or an unassigned account.

2. The method as defined in claim 1, wherein the credit transfer includes the transfer of at least one of money or minutes to the account associated with the device identifier.

3. The method as defined in claim 1, wherein the device identifier includes at least one of a telephone number, an internet protocol (IP) address, an electronic mail address, a universal resource locator (URL), or a device hardware serial number.

4. The method as defined in claim 1, further including:
   determining the account associated with the device identifier is an active account type when the indication that the credit transfer was successful is received.

5. The method as defined in claim 1, further including identifying a service provider associated with the account based on the device identifier.

6. The method as defined in claim 1, wherein the requesting of the revocation of the credit transferred to the account via the credit transfer includes sending a request to void and recuperate the credit transferred.

7. An apparatus to determine a status of an account associated with a device, the apparatus comprising:
   a credit requestor to initiate a credit transfer to the account associated with the device, the credit transfer identifying a device identifier of the device and the account associated with the device identifier; and
   a response analyzer to:
      determine, in response to receiving an indication that the credit transfer was successful, the account associated with the device identifier is a prepaid account type, the credit requestor to request revocation of credit transferred to the account via the credit transfer in response to the indication that the credit transfer was successful; and
      determine based on an error included in the indication that the credit transfer was unsuccessful, in response to receiving an indication that the credit transfer was not successful, the account associated with the device identifier is a contractual account, an inactive account, or an unassigned account;
   at least one of the credit requester or the response analyzer including hardware.

8. The apparatus as defined in claim 7, wherein the response analyzer is to send a request to transfer at least one of money or minutes to the account associated with the device identifier.

9. The apparatus as defined in claim 7, wherein the device identifier includes at least one of a telephone number, an internet protocol (IP) address, an electronic mail address, a universal resource locator (URL), or a device hardware serial number.

10. The apparatus as defined in claim 7, wherein the response analyzer is further to determine that the account associated with the device identifier is an active account type when the indication that the credit transfer was successful is received.

11. The apparatus as defined in claim 7, further including a service provider identifier to identify a service provider associated with the account based on the device identifier by polling a device identifier database.

12. The apparatus as defined in claim 7, wherein the credit requestor is to send a request to void and recuperate the credit transferred.

13. A tangible computer readable storage medium comprising instructions that when executed, cause a machine to at least:
- initiate a credit transfer to an account associated with a device, the credit transfer identifying a device identifier of the device and the account associated with the device identifier;
- in response to receiving an indication that the credit transfer was successful:
  - determine that the account associated with the device identifier is a prepaid account type, and request a revocation of credit transferred to the account via the credit transfer; and
- determine based on an error included in the indication that the credit transfer was unsuccessful, in response to receiving an indication that the credit transfer was unsuccessful, the account associated with the device identifier is a contractual account, an inactive account, or an unassigned account.

14. The tangible computer readable storage medium as defined in claim 13, wherein the instructions, when executed, further cause the machine to:
- determine the account associated with the device identifier is an active account type when the indication that the credit transfer was successful is received.

15. The tangible computer readable storage medium as defined in claim 13, wherein the instructions, when executed, cause the machine to initiate a request to transfer at least one of money or minutes to the account associated with the device identifier.

16. The tangible computer readable storage medium as defined in claim 13, wherein the device identifier includes at least one of a telephone number, an internet protocol (IP) address, an electronic mail address, a universal resource locator (URL), or a device hardware serial number.

17. The tangible computer readable storage medium as defined in claim 13, wherein the instructions, when executed, further cause the machine to identify a service provider associated with the account based on the device identifier.

18. The tangible computer readable storage medium as defined in claim 13, wherein the instructions, when executed, further cause the machine to send a request to void and recuperate the credit transferred.

* * * * *